United States Patent [19]

Miller

[11] 3,719,876

[45] March 6, 1973

[54] MOTOR SPEED CONTROL SYSTEM USING CONTROLLED RECTIFIERS

[75] Inventor: Luther B. Miller, Plano, Tex.

[73] Assignee: Polyspede Electronics Corporation, Dallas, Tex.

[22] Filed: Aug. 18, 1971

[21] Appl. No.: 172,784

[52] U.S. Cl. ................................ 318/341, 321/45 C
[51] Int. Cl. ............................................. H02p 5/16
[58] Field of Search .............. 321/45 C; 318/341, 345

[56] References Cited

UNITED STATES PATENTS

| | | | |
|---|---|---|---|
| 3,229,191 | 1/1966 | Williamson | 321/45 C |
| 3,555,389 | 1/1971 | Opal | 318/345 |
| 3,365,640 | 1/1968 | Gurwicz | 318/345 |
| 3,624,476 | 11/1971 | Bruscaglioni | 321/45 C |

Primary Examiner—Bernard A. Gilheany
Assistant Examiner—Thomas Langer
Attorney—Richards, Harris & Hubbard

[57] ABSTRACT

A DC motor control system which includes a first controlled rectifier connected in series between a DC voltage source and a DC motor. A second controlled rectifier is connected across the first controlled rectifier, with a capacitor connected between the anodes of the first and second controlled rectifiers. Control signals are applied to the gates of the first and second controlled rectifiers to selectively fire the rectifiers. At least one transistor switch is connected between the DC voltage source and the anode of the second controlled rectifier and is operable in response to the application of control signals for controlling the flow of current to the capacitor. Circuitry is provided to modulate the frequency of control signals applied to the controlled rectifiers for speeds below a predetermined speed threshold. Circuitry modulates the width of the control signal pulses applied to the controlled rectifiers for control of the DC motor for speeds over the predetermined speed threshold.

14 Claims, 4 Drawing Figures

INVENTOR:
LUTHER MILLER

INVENTOR:
LUTHER MILLER

Richards, Harris & Hubbard
ATTORNEYS

MOTOR SPEED CONTROL SYSTEM USING CONTROLLED RECTIFIERS

FIELD OF THE INVENTION

This invention relates to the control of DC motors operating from a DC voltage supply, and more particularly to use of silicon controlled rectifiers for control of a DC motor along with circuitry for positively controlling the switching of the silicon controlled rectifiers and including circuitry for providing both frequency and pulse width modulation of the control signals applied to the DC motor.

THE PRIOR ART

It has heretofore been known to utilize silicon controlled rectifiers in the control of the speed of variable speed DC motors operating from a DC voltage supply. In such systems, the silicon controlled rectifiers are intermittently switched to provide an intermittent supply of DC voltage across the armature of a series filed DC motor. In such systems, in order to turn the switching silicon controlled rectifier off after the firing thereof, a second silicon controlled rectifier, loaded with a resistor, has heretofore been utilized in order to selectively back bias the first silicon controlled rectifier. However, the sole use of a second silicon controlled rectifier in such circuits is not generally satisfactory, as unnecessary power dissipation occurs in the loading resistor. More importantly, such systems are subject to becoming "locked up" by having both controlled rectifiers simultaneously fired upon the occurrence of a temporary overload or during turn on and other transient conditions of the controlled motor.

In attempts to overcome the problems of excessive power dissipation and to prevent "lock up" of such silicon rectifier motor control circuits, it has heretofore been known to place fuses in the control circuit to prevent damage upon stalling of the motor. Additionally, automatic fuse systems have been heretofore proposed, as exemplified by U.S. Pat. No. 3,274,474, issued to Dow on Sept. 20, 1966. Other techniques such as the use of reactive loads for the second silicon controlled rectifier and the use of additional silicon controlled rectifiers have been heretofore proposed, but such systems have not been completely satisfactory with respect to the prevention of "lock up" or to the elimination of excessive power dissipation.

In a majority of previously developed silicon controlled rectifier control circuits for DC motors, pulse width modulation of the control signals applied to the controlled rectifiers has generally been used. Such pulse width modulation is disadvantageous at operation at low speeds and may result in bumping and rough operation, and in fact some prior art systems approach the exceeding of commutation limits of the control system at low speeds. However, it is generally desirable to utilize pulse width modulation at higher motor speeds in order to conserve battery energy by minimizing commutation losses.

SUMMARY OF THE INVENTION

In accordance with the present invention, a silicon controlled rectifier circuit is provided which eliminates or substantially reduces many of the problems inherent in previously developed DC motor control systems. In particular, the present invention precisely controls a variable speed motor drive, without excessive energy loss in the resistive or reactive load therein and while positively preventing "lock up" of the system. Moreover, the present invention provides pulse frequency modulation of the silicon controlled rectifier system at low motor duty cycles, while providing pulse width modulation at higher motor duty cycles to provide efficient operation of the motor at both low and high speeds, without the attendant problems in prior art devices.

In accordance with a more specific aspect of the present invention, a motor control system is provided wherein a first controlled rectifier is repeatedly fired to permit current flow from a source through a motor armature. A second controlled rectifier is coupled to the first controlled rectifier and circuitry is provided to alternately fire the second controlled rectifier. An electronic switch is operable in response to the control signal for synchronously applying and terminating current flow to the capacitor which couples the two rectifiers.

In accordance with another aspect of the invention, a DC motor control system includes a first controlled rectifier connected in series between a DC voltage source and a DC motor. A second controlled rectifier is connected at one terminal to the like terminal of the first controlled rectifier. A capacitor is connected between the second like terminals of the first and second controlled rectifiers. Circuitry selectively fires the first and second controlled rectifiers by applying control signals to the gates thereof. An electronic switch is connected between the DC voltage source and a second terminal of the second controlled rectifier and is operable in response to the application of control signals for controlling the flow of current to the commutating capacitor.

In accordance with another aspect of the invention, a DC motor control system includes circuitry for supplying current pulses to the armature of a DC motor for operation thereof. Circuitry modulates the frequency of the pulses for control of the speed of the motor at speeds below a predetermined speed threshold. Circuitry modulates the width of the pulses for control of the speed of the motor for speeds over the predetermined speed threshold. Moreover torque limiting is provided to the motor, the maximum battery current allowed by the invention being increased as the duty cycle of battery current pulses increases.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENTS

Figure 1:
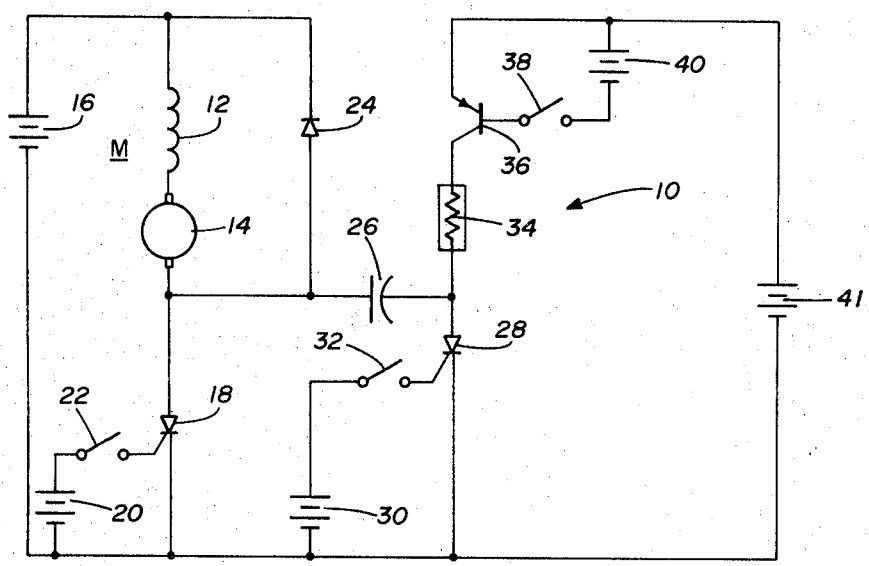
FIG. 1 is a schematic diagram of the basic circuit according to the invention.

Referring to FIG. 1, a motor control circuit according to the invention is identified generally by the numeral 10. Circuit 10 controls the speed of a motor M having a field winding 12 and an armature 14. A battery 16 is coupled across the circuit for exitation of the motor. A first silicon controlled rectifier 18 is connected at its anode to a terminal of the armature 14 and at the cathode to the negative terminal of the battery 16. A battery or other voltage source 20 is adapted to be connected through a switch 22 to the gate electrode of the silicon controlled rectifier 18.

A diode 24 is connected across the field winding 12 and the armature 14 and acts as a "flywheeling" diode in the well known manner. A capacitor 26 is connected between a terminal of the armature 14 and at the anode of a second silicon controlled rectifier 28. The cathode of rectifier 28 is connected to the battery 16. A battery or other voltage source 30 is connected through a switch 32 to the gate electrode of the rectifier 28. A load resistance or reactance 34 is connected between the anode of the rectifier 28 and the collector of a transistor 36. The emitter of transistor 36 is connected to the positive terminal of the battery 16, while the base of the transistor 36 is coupled through a switch 38 to a battery or other source of voltage 40. A battery 41 is connected to supply power to the circuit, it being understood that for relatively low power requirements batteries 16 and 41 could be a single battery source.

In operation of the circuit shown in FIG. 1, switch 22 is momentarily closed to fire rectifier 18 and current flow is initiated through the field winding 12 and the armature 14. Also switch 38 is closed for the duration of the power cycle of the motor. Transistor 36 is thus turned on and current flow is initiated through resistor 34, capacitor 26, and rectifier 18 and the capacitance 26 thus becomes charged, right-hand plate positive. In order to terminate the power cycle of the motor, switch 38 is opened and switch 32 is momentarily closed. Transistor 36 then becomes nonconductive and the silicon controlled rectifier 28 is turned on. Current flow through the field winding 12 and the armature 14 is then diverted from the silicon controlled rectifier 18 through capacitor 26 and silicon controlled rectifier 28. Silicon controlled rectifier 18 is thus reverse biased until the charge on the capacitor 26 reaches zero voltage.

Assuming that the time required for the voltage across the capacitor 26 to reach zero is greater than the turn off time of the silicon controlled rectifier 18, the rectifier 18 will remain off and current flow into capacitor 26 will continue until capacitor 26 is charged, left-hand plate positive to a voltage slightly higher than battery 16 voltage. At this time current flow through the armature 14, sustained by the inductance therein, ceases to flow into capacitor 26 and rectifier 28 and begins to flow through the flywheeling diode 24. Battery current approaches zero and current through rectifier 28 goes to zero. When it is again desired to start the next power cycle, switch 38 is again closed to energize the transistor 36 and switch 22 is momentarily closed. The silicon controlled rectifier 18 is again fired and conducts motor current. Conduction of the transistor 36 allows recharging of the capacitor 26 through the resistance 34. When the silicon controlled rectifier 18 is fired, the anode of the silicon controlled rectifier 28 goes negative thus assuring that rectifier 28 remains off.

It will thus be seen that, with the use of the circuit shown in FIG. 1, the silicon controlled rectifier 18 is positively controlled without the possibility of "lock up" of the circuit wherein both silicon controlled rectifiers 18 and 28 are simultaneously conducting. The present circuit operates such that rectifier 28 of the present circuit may always be positively turned off, while in prior art circuits without such positive turn-off provision both rectifiers 18 and 28 may become conductive simultaneously due to failure of rectifier 18 to turn off. When such an event occurs in prior art circuits, capacitor 26 becomes discharged and cannot again be charged, and "lock-up" occurs. The use of the electronic switch 36 prevents "lock-up" by synchronously eliminating a current path to the silicon controlled rectifier 28 during the termination of the power cycle. The elimination of the current path to the rectifier 28 causes the rectifier to turn off by current decay regardless of the status of rectifier 18.

Figure 2:
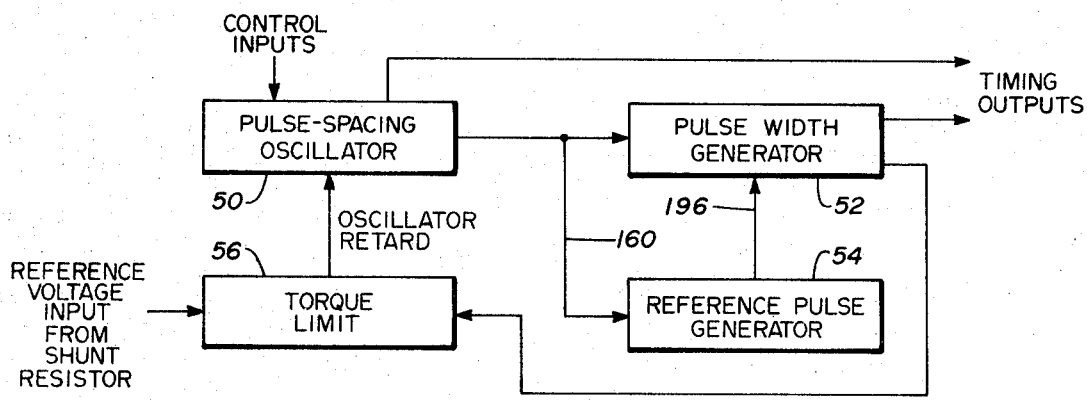
FIG. 2 is a block diagram of the timing signal generator circuitry of the invention.

FIG. 2 illustrates in block diagram form the circuitry for generating the timing signals which control the operation of the switches 22, 32 and 38 diagrammatically shown in FIG. 1. Control inputs are applied to a pulse-spacing oscillator 50. The control inputs can be generated by the acceleration footfeed of a vehicle upon which the motor to be controlled is mounted, or from any other suitable speed control device. The outputs from the pulse-spacing oscillator are fed to a pulse width generator 52 which operates to adjust the width of the present control pulses. The output from the oscillator 50 is also applied to a reference pulse generator 54 which generates fixed width pulses, integrates them, and delivers them to the generator 52 during operation of the system. An output from the pulse width generator 52 is also applied to a torque limit circuit 56 which generates an Oscillator Retard signal to the oscillator 50. A voltage input from a current sensing shunt resistor is applied to the torque limit circuit 56.

Figure 3:
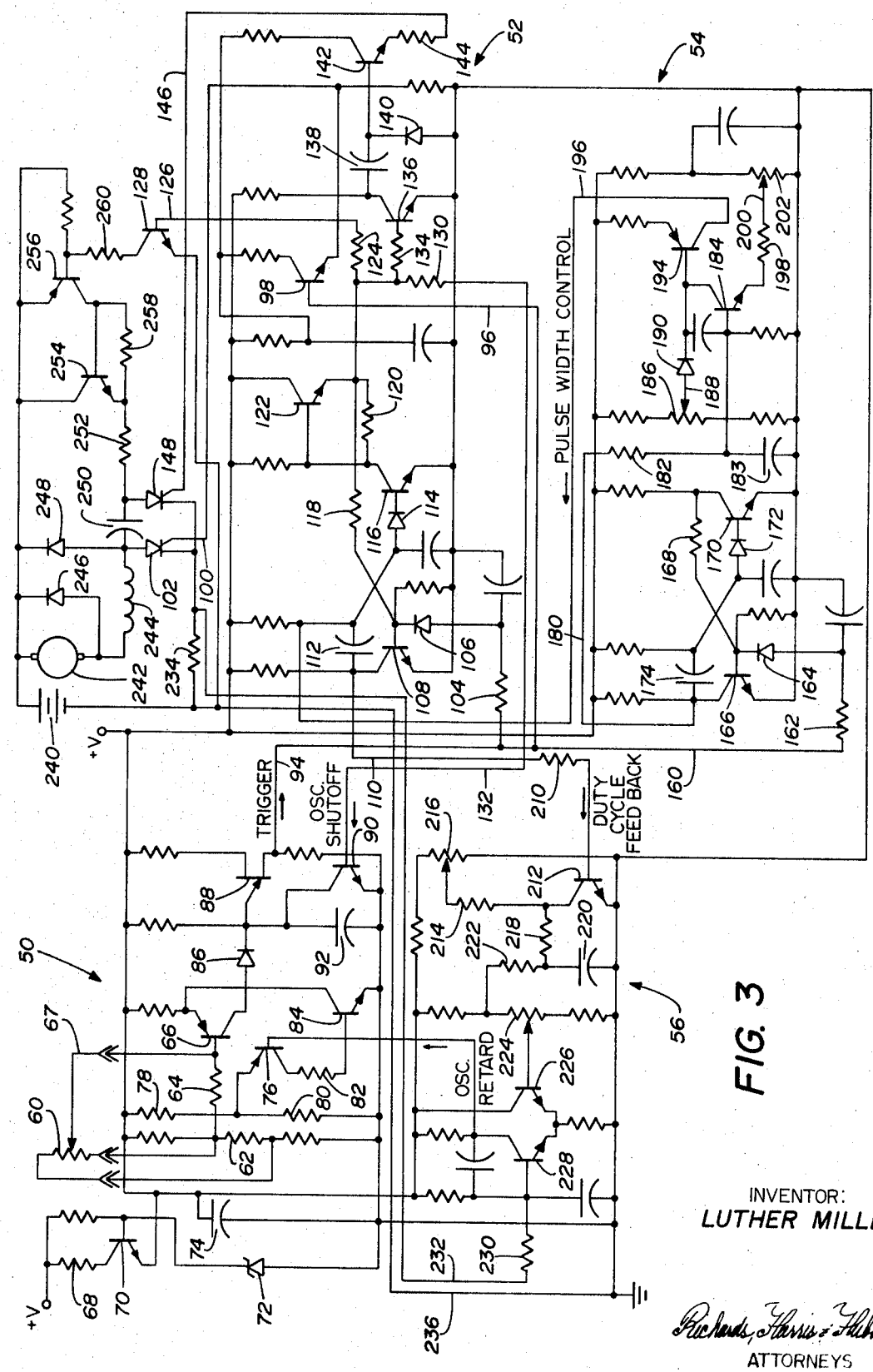
FIG. 3 is a schematic diagram of the block diagram shown in FIG. 2.

FIG. 3 illustrates in schematic detail the circuit shown in FIG. 2. A variable resistance 60 may comprise for instance the accelerator footfeed of the vehicle upon which the motor to be controlled is located. Resistor 60 is connected across a resistor 62, with one terminal of resistance 62 being connected through a resistance 64 to the base of a transistor 66. Lead 67 connects the base of transistor 66 to the movable arm of the variable resistance 60. A source of bias voltage is applied through a resistance 68 to the collector of a transistor 70, the emitter of which is connected to the lead marked +v. The voltage between the emitter of transistor 70 and circuit ground is regulated by zener diode 72 and filtered by capacitor 74. The emitter of a transistor 76 is connected to the junction of resistors 78 and 80 which are tied across a supply of bias voltage and circuit ground.

The Oscillator Retard signal generated from the torque limit circuit is applied to the base of transistor 76. The collector of transistor 76 is fed through a resistance 82 to the base of a transistor 84. The collector of transistor 84 is directly coupled to the emitter of transistor 66. The collector of transistor 66 is applied through a diode 86 to the emitter of a unijunction transistor 88. The cathode of the diode 86 is connected to the collector of a transistor 90, the base of which is connected to receive an Oscillator Shutoff signal from the pulse width generator. A capacitor 92 is coupled across the collector of transistor 90 and circuit ground. The output of the transistor 88 is connected via a lead 94 to provide a trigger signal to the pulse width generator 52. The output signals applied on lead 94 comprise a pulse train having a frequency proportional to the setting of the resistance 60, and the length of time transistor 90 is held saturated by the oscillator shutoff signal.

This pulse train is applied via lead 96 to the base of a transistor 98. The emitter of transistor 98 is connected through a lead 100 to the gate electrode of a silicon controlled rectifier 102. The pulse train supplied by the pulse-spacing oscillator 50 is also applied through a resistance 104 to the anode of a diode 106. The cathode of diode 106 is connected to the base of a transistor 108, the collector of which is connected via lead 110 to supply a Duty Cycle Feedback signal to the torque limit circuit 56. The collector of transistor 108 is also coupled through a capacitance 112 and through a diode 114 to the base of a transistor 116.

The base of transistor 108 is coupled through resistance 118 and the emitter-base junction of transistor 122 to the collector of transistor 116. Resistance 120 provides voltage bias to transistor 122. The collector of transistor 116 is connected to the base of a transistor 122, the emitter of which is connected through a resistance 124 to a lead 126 which is connected to the base of a transistor 128. Transistors 108 and 116, along with their associated circuitry, comprise a variable pulse width monostable multivibrator. The output pulses from the multivibrator are fed to the lead 126 and also through a resistance 130 and via lead 132 to the base of a transistor 90 to act as an Oscillator Shutoff signal. The terminal of resistance 130 is connected to a terminal of a resistance 134 connected to the base of a transistor 136. The collector of transistor 136 is coupled through a capacitor 138 to the cathode of a diode 140. Capacitor 138 is also connected to the base of a transistor 142, the emitter of which is coupled through a resistance 144 to a lead 146. Lead 146 is connected to the gate electrode of a silicon controlled rectifier 148 which is operable to turn off the rectifier 102 in the manner previously described. A pulse appears on lead 146 each time that the variable pulse width monostable multivibrator completes a cycle.

The output from the pulse-spacing oscillator 50 is also applied via lead 160 to the reference pulse generator 54. Lead 160 is connected through a resistance 162 and through a diode 164 to the base of a transistor 166. The base of transistor 166 is connected through a resistance 168 to the collector of a transistor 170. The base of transistor 170 is coupled through a diode 172 and a capacitor 174 to the collector of transistor 166 to comprise a monostable multivibrator circuit.

The output from the multivibrator is applied through a conductor 180 and a resistance 182 to a capacitor 183 and to the base of a transistor 184. A variable resistance 186 includes a movable resistor arm 188 which is connected through a diode 190 to the collector of transistor 184. The setting of variable resistance 186 controls the pulse width operation of the generator 52. The collector of transistor 184 is directly connected to the base of transistor 194, with the collector of transistor 194 connected through conductor 196 to provide a pulse width control signal to the variable pulse width monostable multivibrator of generator 52. The emitter of transistor 184 is connected through a resistance 198 to a variable resistance arm 200 of the variable resistor 202. The setting of the variable resistor 202 controls the crossover point between pulse frequency modulation and pulse width modulation of the present circuit.

The Duty Cycle Feedback signal is applied via lead 110 and through a resistance 210 to the base of a transistor 212 to automatically increase the torque limit setting as duty cycle increases. The collector of transistor 212 is coupled through a resistance 214 to the movable arm of a variable resistance 216. The setting of resistance 216 controls the maximum value to which the torque limit point may be raised by the duty cycle feedback signal in the present device. The collector of transistor 212 is connected through a resistance 218 to a capacitor 220. Resistor 218 is also connected through a resistance 222 to a variable resistance 224. The setting of resistance 224 sets the torque limit for the low duty cycles in the present device. The movable arm of the variable resistance 224 is directly coupled to the base of a transistor 226. The emitter of transistor 226 is connected to the emitter of a transistor 228, the collector of which generates the Oscillator Retard signal which is fed back to the base of transistor 76 for torque control thereof. The base of transistor 228 is connected through a resistance 230 to a lead 232 which is connected to a shunt resistor 234. The other terminal of resistor 234 is connected via lead 236 to circuit ground.

Shunt resistor 234 is connected in series with a battery or other voltage source 240 which supplies current to an armature 242 and a field winding 244 of the motor to be controlled. A conventional plugging diode 246 is connected across the armature 242, while freewheeling diode 248 is connected across the armature 242 and the field winding 244 of the motor. A capacitor 250 is connected across the anodes of the silicon controlled rectifiers 102 and 148. A resistance or reactance 252 connects the anode of silicon controlled rectifier 148 to the emitter of a transistor 254. The base of transistor 254 is directly connected to the collector of transistor 256. The collector of transistor 256 is connected to the emitter of transistor 254 through a resistance 258. The connections to transistors 254 and 256 provide a Darlington configuration. The base of transistor 256 is connected through a resistance 260 to the collector of transistor 128. Transistors 254, 256 and 128 correspond to the electronic switch 36 of FIG. 1.

In operation of the circuitry shown in FIG. 3, the variable resistor 60 is set by the operator to the desired speed and the resulting voltage on lead 67 is sensed by the base of transistor 66. The resulting current from the transistor 66 charges capacitor 92. When the voltage across capacitor 92 reaches the firing level of the unijunction transistor 88, the transistor 88 fires and generates a pulse on lead 94. Transistor 90 shorts the current from capacitor 92 in response to an Oscillator Shutoff signal applied on lead 132 in order to prevent the next firing of the transistor 88 until the desired time.

The trigger pulses applied on lead 94 are amplified by transistor 98 and applied via lead 100 to the gate electrode of the silicon controlled rectifier 102. The trigger pulses are also applied to the variable pulse width monostable multivibrator through diode 106 in order to trigger the multivibrator cycle. The trigger pulses are also applied to the constant width multivibrator through diode 164 for triggering thereof.

The output of the variable pulse width monostable multivibrator is applied through transistor 122 connected in an emitter follower configuration. The output from transistor 122 is applied through resistor 130 and lead 132 in order to saturate transistor 90 to inhibit any further start of a timing cycle until the pulse width generator 52 completes its timing cycle. The trailing edge of the monostable multivibrator output from transistor 122 is differentiated by capacitor 138 and associated circuitry. The signal is then amplified by transistor 142 and applied via resistor 144 and lead 146 to turn on the silicon controlled rectifier 148 in order to initiate the commutation cycle of the system.

The square wave output from the emitter follower transistor 122 also is applied via lead 126 to the base of transistor 128. Transistor 128 drives the Darlington configuration transistor switch comprised of transistor 254 and transistor 256 in order to positively control the charging of capacitor 250 in the manner previously described.

The trigger pulses applied via lead 94 are also applied to initiate the operation of the monostable multivibrator comprising transistors 166 and 170. The period of operation of this multivibrator is much shorter than the period of the variable pulse width multivibrator. The output from the reference pulse multivibrator is fed via lead 180 and resistor 182 and is stored on capacitor 183. The voltage across the capacitor 183 is thus inversely proportional to the duty cycle of the system. The voltage across capacitor 183 drives transistor 184 when the base voltage of transistor 184 exceeds the emitter voltage thereof. The conduction of transistor 184 controls the operation of transistor 194 which generates a control signal via lead 196 which varies the period of the variable pulse width monostable multivibrator in such a manner that the voltage on capacitor 183 remains nearly constant for any further increases in setting of resistor 60.

The minimum cycle time provided to the pulse width generator 52 occurs when the collector current from transistor 194 is maximum, as determined by the setting of the variable resistor 186, provided transistor 184 is conducting heavily. As the duty cycle increases to a predetermined point which is determined by the variable resistor 202, the conduction of transistor 184 decreases, thus decreasing the collector current of transistor 194 and allowing the pulse width generator cycle time to increase. After the duty cycle has increased above the predetermined point determined by the setting of the variable resistor 202, the repetition rate at which the pulse width generator 52 cycles remains nearly constant and the pulse width control signal generated thereby will increase linearly in response to increased accelerator setting of the resistor 60.

A duty cycle feedback signal is applied via lead 110 through resistor 210 to the base of a transistor 212 in the torque limit circuit. Resistors 214, 216, 218 and transistor 212 are arranged such that the average voltage stored upon capacitor 220 increases linearly as the duty cycle increases. The voltage across the capacitor 220 increases the reference voltage which is applied to a differential amplifier comprising transistors 226 and 228. The current feedback signal is applied to the differential amplifier by sensing the current flow through resistor 234 and by applying sensed current through resistor 230 to the base of transistor 228. The differential amplifier compares the voltage at the moveable arm of resistor 224 with the sensed voltage from the shunt resistor 234.

When the current sensed across resistor 234 exceeds the voltage on the moveable arm of resistor 224, an Oscillator Retard signal is fed to the base of transistor 76. In response thereto, transistor 76 and transistor 84 conduct to proportionally decrease the current applied to capacitor 92. The unijunction oscillator repetition firing rate is thus decreased. An important aspect of the invention is the fact that voltage stored on capacitor 220 increases linearly as the duty cycle increases. This voltage increases the reference voltage across resistor 224 to thereby raise the current limit point for high duty cycles. This permits higher battery currents at higher duty cycles and more severe limiting of battery current at low duty cycles.

Figure 4:
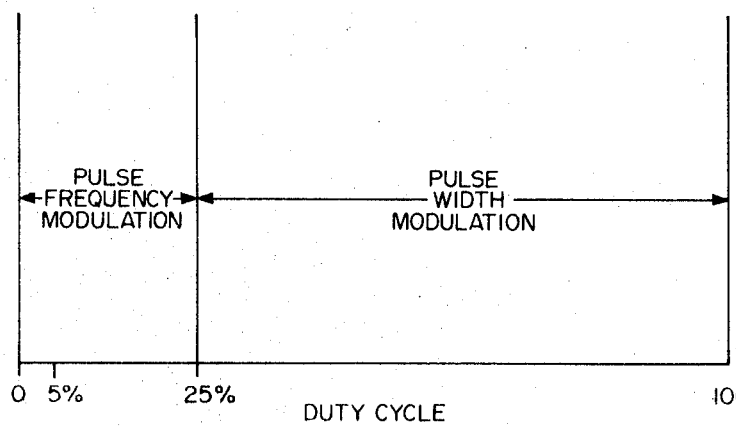
FIG. 4 is a graph illustrating the variance of the modulation of the pulses applied for control of the DC motor according to the invention.

FIG. 4 somewhat diagrammatically illustrates the operation of the reference pulse generator 54 and the pulse width generator 52. For duty cycles of the motor from 0-25 percent, pulse frequency modulation is provided by the pulse width generator 52, due to the fact that the control signals applied from the reference pulse generator 54 on lead 196 are substantially constant. However, for duty cycles above 25 percent and up to 100 percent, the control signals applied via lead 196 from the reference pulse generator 54 vary to change the pulse width generated by the variable pulse width monostable multivibrator in the pulse width generator 52, and to hold the repetition rate of trigger signals entering the reference pulse generator 54 via lead 160 nearly constant.

The present system thus provides a motor control device which is particularly useful for motor control of battery operated vehicles such as golf carts, riding floor sweepers, lawnmowers, fork-lift trucks, and the like. The provision of the electronic switch enables positive control of the silicon controlled rectifiers of the invention without the possibility of "lock up." Moreover, the present system provides pulse frequency modulation for low duty cycles, thus providing smooth operation of the system at low speeds. The provision of pulse width modulation at higher duty cycles provides economical and efficient operation of the motor at higher speeds. The torque limiting aspects of the present invention reduces the possibility of of danger of damage by limiting battery current to the motor at higher motor shaft loads. The torque limiting circuitry of the invention also tends to keep the motor current within commutation limits and maintains the silicon controlled rectifier heating within the manufacturer's specifications.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A motor control system wherein a first controlled rectifier is repeatedly fired to permit current flow from a source through the motor armature comprising:
   a second controlled rectifier and commutating capacitor coupled to said first controlled rectifier,
   means for controlled firing of said first and second controlled rectifiers, and
   switch means operable in response to means for generating a control signal, said control signal for synchronously applying current flow to said commutating capacitor and said second controlled rectifier and for subsequently positively terminating current flow through said capacitor and said second controlled rectifier.

2. The motor control system of claim 1 wherein said switch means comprises an electronic device having a control electrode for control of current flow through said devices.

3. The motor control system of claim 1 wherein said switch means comprises a transistor.

4. The motor control system of claim 1 and further comprising:
   circuit means responsive to the setting of a speed selection device for generating a pulse train having a frequency and pulse width proportional to the selected speed,
   pulse width generator circuitry for varying the width of said pulses for speeds exceeding a selected threshold, and
   means connecting the output of said generator circuitry for control of the operation of said controlled rectifiers and said switch means.

5. The motor control system of claim 1 and further comprising:
   torque limiting means for sensing current flow to said control system,
   means for comparing the sensed current flow to a preset reference value, and
   means responsive to said comparing means for decreasing the repetition rate and width of current pulses to the motor.

6. The motor control system of claim 5 and further comprising:
   means for increasing said reference value in response to increasing pulse duty cycles.

7. A DC motor control system comprising:
   a first controlled rectifier connected in series between a DC voltage source and said motor,
   a second controlled rectifier connected at one terminal to the like terminal of said first controlled rectifier,
   a capacitor connected between the second like terminals of said first and second controlled rectifiers,
   means for selectively firing said first and second controlled rectifiers by the application of control signals to the gates thereof, and
   switch means including at least one transistor having a control terminal, said switch means being connected between said DC voltage source and said second terminal of said second controlled rectifier and operable in response to the application of control signals to said control terminal for controlling the flow of current to said second controlled rectifier and capacitor and thereby preventing lockup of the motor control system.

8. The motor control system of claim 7 wherein said first controlled rectifier and said switch means are energized to provide a power cycle to the motor.

9. The motor control system of claim 8 wherein said switch means is deenergized and said second controlled rectifier is energized for termination of the motor power cycle.

10. A motor control system wherein a first controlled rectifier is repeatedly fired to permit current flow from a source through the motor armature comprising:
    a second controlled rectifier and commutating capacitor coupled to said first controlled rectifier,
    means for controlled firing of said second controlled rectifier,
    switch means operable in response to a control signal for synchronously applying and terminating current flow to said commutating capacitor and said second controlled rectifier,
    circuit means responsive to the setting of a speed selection device for generating a pulse train having a frequency and pulse width proportional to the selected speed,
    pulse width generator circuitry for varying the width of said pulses for speeds exceeding a selected threshold, said circuitry comprising:
    a variable period multivibrator, and
    circuit means for maintaining the period of said multivibrator at a predetermined minimum value for speeds under said selected threshold and for increasing the period of said multivibrator in response to increasing speeds over said selected threshold, and
    means connecting the output of said generator circuitry for control of the operation of said controlled rectifiers and said switch means.

11. A DC motor control system comprising:
    a first controlled rectifier connected in series between a DC voltage source and said motor,
    a second controlled rectifier connected at one terminal to the like terminal of said first controlled rectifier,
    a capacitor connected between the second like terminals of said first and second controlled rectifiers,
    means for selectively firing said first and second controlled rectifiers by the application of control signals to the gates thereof,
    switch means connected between said DC voltage source and said second terminal of said second controlled rectifier and operable in response to the application of control signals for applying and terminating the flow of current to said second controlled rectifier and capacitor,
    means responsive to a speed selection device for generating a pulse train having a frequency and pulse width proportional to the selected speed,
    pulse width generator circuitry for varying the width of said pulses for speeds over a selected threshold, and means connecting the output of said generator circuitry for control of the operation of said controlled rectifiers and said switch means.

12. A DC motor control system comprising:
  means for supplying current pulses to the motor for operation thereof,
  means for modulating the frequency of said pulses for control of the speed of the motor for duty cycles below a predetermined threshold, and
  means for modulating the width of said pulses for control of the speed of the motor for duty cycles over said predetermined threshold.

13. The system of claim 12 wherein said width modulating means comprises:
  a variable pulse width multivibrator, and
  means for generating control signals for said multivibrator which vary the pulse width operation thereof for duty cycles over said predetermined threshold.

14. The system of claim 13 wherein said means for generating control signals comprises:
  means for generating a pulse train,
  means for averaging said pulse train and for controlling the operation of an electronic control device,
  said electronic control device generating a generally constant control signal until the duty cycle increases above said predetermined threshold, after which said electronic control device generates a control signal which varies the pulse width of said current pulses supplied to the motor, and holds the frequency of said current pulses relatively constant.

* * * * *